J. R. LITTLE.
Thill-Couplings.
No. 148,127.                    Patented March 3, 1874.
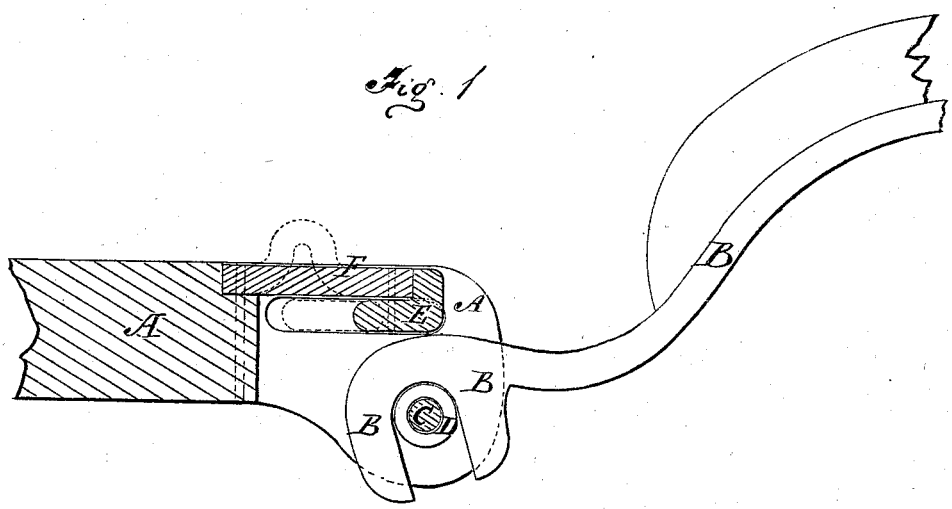
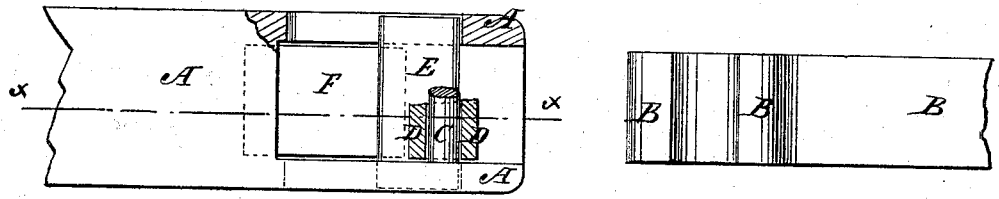
WITNESSES.
INVENTOR.
BY
ATTORNEYS.

UNITED STATES PATENT OFFICE.

J. RUSSELL LITTLE, OF JAMAICA PLAINS, MASSACHUSETTS.

IMPROVEMENT IN THILL-COUPLINGS.

Specification forming part of Letters Patent No. 148,127, dated March 3, 1874; application filed January 10, 1874.

*To all whom it may concern:*

Be it known that I, J. RUSSELL LITTLE, of Jamaica Plains, in the county of Norfolk and State of Massachusetts, have invented a new and useful Improvement in Thill-Coupling, of which the following is a specification:

Figure 1 is a detail longitudinal section of my improved coupling, taken through the line $x$ $x$, Fig. 2. Fig. 2 is an under-side view of the same, parts being broken away to show the construction.

Similar letters of reference indicate corresponding parts.

My invention has for its object to furnish an improved coupling for connecting thills or a pole with the axle of a carriage, which shall be simple in construction, convenient in use, and safe and reliable in operation. The invention consists in an improved thill-coupling, formed by the combination of the slotted bar, the hook thill-iron, and the retainer with each other, as hereinafter fully described.

A represents a bar attached to the carriage-axle, and which may be the yoke of an axle-clip. The forward end of the bar A is slotted or notched to receive the thill-iron B, and to the ears thus formed is attached a bolt, C, which may have a tubular rubber washer, D, placed upon it to prevent rattling. The head of the thill-iron B is made with a deep transverse notch or slot in its under side to fit upon the bolt C, the hook thus formed being made of sufficient strength to sustain the draft-strain. E is the retainer, which is a small bar of iron, the ends of which work in slots formed in the bar A, and which, when pushed into the forward ends of its slots, comes so far over the hook-head of the thill-iron B as to prevent the said thill-iron from being raised from the bolt C without first pushing back the said retainer E. The retainer is held forward by a spring, F, of rubber or other suitable material attached to the bar A, and which will allow the said retainer to be pushed back when it is desired to attach or detach the thills or pole. If desired, the hook may be connected with the axle and the bolt connected with the thill-iron, and the retainer may be variously arranged, as the particular construction of the coupling may require.

Having thus described my invention, I claim as new and desire to secure by Letters Patent—

In combination with the shackle-bar A, hooked thill-iron B, and bolt C, the sliding retaining-bar E and spring F, for preventing the displacement of the thill-iron, substantially as shown and described.

J. RUSSELL LITTLE.

Witnesses:
CHAS. P. JOHNSON,
CHAS. J. PAGE.